Oct. 19, 1937.  E. G. GRIFFITH  2,096,105
CONVEYER
Filed Jan. 31, 1936
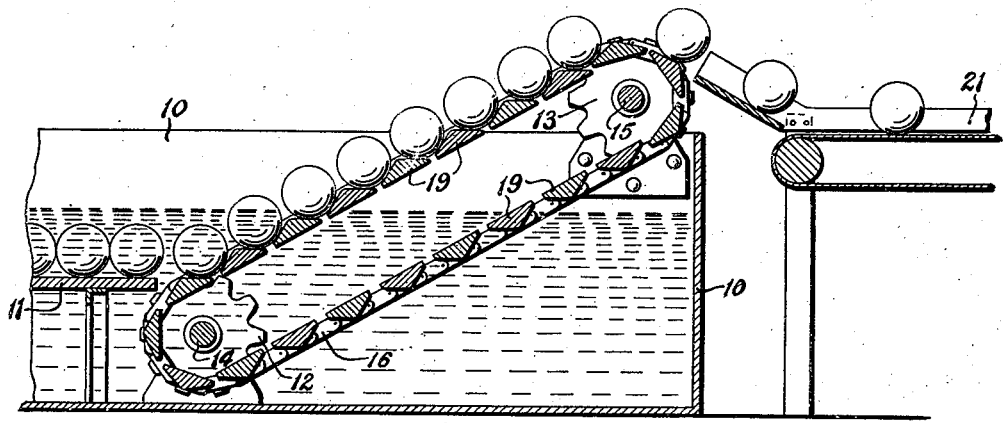
Fig. 1
   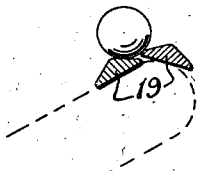   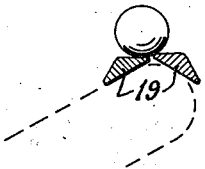
Fig. 2        Fig. 3        Fig. 4
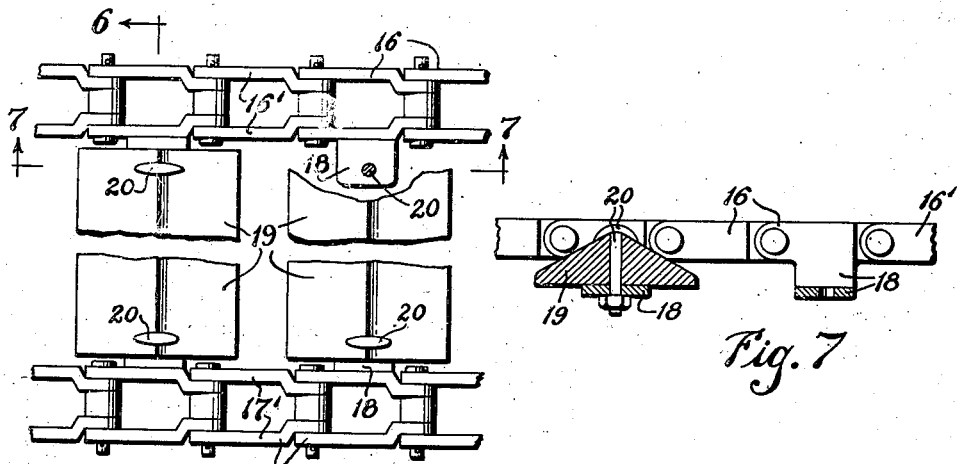
Fig. 5        Fig. 7
Fig. 6
INVENTOR,
Earl G. Griffith,
BY
ATTORNEY.

Patented Oct. 19, 1937

2,096,105

UNITED STATES PATENT OFFICE 2,096,105

CONVEYER

Earl G. Griffith, Los Angeles, Calif.

Application January 31, 1936, Serial No. 61,710

6 Claims. (Cl. 198—195)

My invention relates more particularly to endless conveyers designed for handling fruit and the like, such conveyer being particularly adapted to pick up the fruit from a washing tank or other supply source and to convey it to another position and deposit it gently at such other position.

Among the salient objects of my invention are: to provide a conveyer of the type referred to in which carrier slats, or bars or similar members are supported at their opposite ends by endless conveyer chains running around suitable sprockets, said slats or members being connected with said endless chains or members below the pitch line of such conveyer chains, whereby to accomplish a certain relative movement of said slats or bars to more effectively and efficiently receive, retain, carry and deposit the fruit or other articles uniformly and gently on to the receiving conveyer or carrier; to provide in such a conveyer carrier bars or members of triangular form in cross section, the bulk of each bar or member being below the pitch line or line of movement of said chains, whereby as said bars or members move around the sprocket wheels at the discharge end of said conveyer, the forward bar or member moves to hold the fruit from rolling off until it is moved further around the arc of the sprockets, whereupon when the following bar or member moves around said arc, the two carrying surfaces of said bars or members move into the same plane and the fruit is rolled gently from the carrier; and, in general, to provide an improved carrier or conveyer structure which is more efficient for handling round objects in rows and conveying them from one location to another.

In order to more fully explain my invention, I have illustrated one practical embodiment thereof on the accompanying sheet of drawings, which I will now describe.

Figure 1 is a longitudinal sectional view through a conveyer apparatus embodying my invention;

Figures 2, 3 and 4 are diagrammatic views showing the relative positions of adjacent carrier bars or members of an endless conveyer and illustrating how they hold and carry round articles to the discharge end of the conveyer;

Figure 5 is a fragmentary, enlarged plan view of an endless conveyer, with parts broken away to show the construction and arrangement thereof;

Figure 6 is a cross sectional view therethrough, taken on line 6—6 of Fig. 5; and Figure 7 is a longitudinal sectional view taken on line 7—7 of Fig. 5.

Referring now in detail to the drawing, 10 designates a washing tank for fruit, with shelf or support 11 therein, said tank being filled with water substantially as indicated.

An endless conveyer including two pairs of sprocket wheels 12, 12, and 13, 13 are shown supported on suitable shafts 14 and 15, respectively, in said tank in any suitable and practical manner. These sprocket wheels carry two endless sprocket chains, 16 and 17, made up of sprocket links 16' and 17', certain of said links having extensions, as 18, on their inner under sides, as shown in Figs. 5, 6 and 7, upon which the opposite ends of cross bars or members 19, 19 are mounted, and to which they are secured by T-bolts 20, 20, as shown clearly in Figs. 6 and 7.

Said cross bars or members are preferably triangular in cross section, and their longer and heavier sides are mounted flatwise upon said supporting extensions 18, and rest below the pitch lines of the sprocket chains 16 and 17, as clearly indicated in Fig. 7. The triangular form of said carrier bars or members forms a trough-like receptacle for the fruit or other round articles to be conveyed, as clearly illustrated, and the relative movements of said bars or members 19, 19, around the arc of the sprocket wheels is such as to hold the articles carried until they pass over the topmost position, when the supporting surfaces of adjacent bars move into the same plane and the fruit rolls therefrom, a complete row rolling therefrom together on to a receiving table or carrier, designated as a whole 21.

Thus I have provided an endless conveyer for carrying articles which includes a series of cross bars or members of triangular form in cross section and connected at their opposite ends to the endless sprocket chains at a point which positions the bar or member with the bulk of its body below the pitch line of the conveyer, that is, the bars or members on the upper lap of said conveyer are below the pitch line and those bars or members on the lower lap of said conveyer are above the pitch line, or, more accurately stated, said cross carrier bars or members are connected within the pitch line of the endless conveyer. This causes a relative functional movement of said bars or members as they travel around their axes, as before described and as illustrated on the drawing.

While I have shown and described one practical form or embodiment of the invention, I am aware that changes in details and arrangement can be made without departing from the spirit of the invention, and I do not, therefore, limit the invention to the exact construction and arrangement shown and described except as I may be limited by the hereto appended claims.

I claim:

1. An endless conveyer for carrying articles which includes a series of cross bars or members of triangular form in cross section and forming carrying troughs between adjacent members, said members being supported below the pitch line of travel of the upper lap of said endless conveyer and through a longitudinal axis of each bar, whereby to produce a relative functioning movement between adjacent cross members as they move around their axes of rotation.

2. An endless conveyer for carrying articles which includes two endless members with means for supporting and driving the same, a series of cross bars of triangular form in cross section and forming troughs between adjacent bars, and means connecting the opposite ends of said bars and through a longitudinal axis of each bar to said endless members at points inside of the pitch line of travel of said endless members.

3. An endless conveyer for carrying articles which includes two pairs of sprockets and two endless sprocket chains thereon and spaced axially of said sprockets, and cross bars connected at their opposite ends and through a longitudinal axis of each bar to said sprocket chains within the pitch line of said chains whereby the bars of the upper lap of said endless conveyer are below the pitch line of said endless conveyer, for the purpose described.

4. An endless conveyer of the character shown and described which includes two shafts, one above and in advance of the other, two sprockets on each shaft, two endless sprocket chains on said sprockets, cross bars connected at their opposite ends, intermediate the opposite edges thereof, to said sprocket chains to position said cross bars at points below the pitch line of travel of the upper lap of said endless conveyer, and above the pitch line of travel of the lower lap of said endless conveyer, for the purpose described.

5. An endless conveyer having parallel cross members of triangular form in cross section and pivotally connected at their opposite ends between their opposite sides to said conveyer with the greater portion of the bodies thereof below the pitch line of said endless conveyer on the upper lap thereof and above the pitch line of said endless conveyer on the lower lap thereof.

6. An endless inclined carrier having a series of parallel cross members attached at their opposite ends between their opposite sides to said carrier and having adjacent surfaces standing at angles to the pitch line of travel, whereby to form carrying trough-like areas between adjacent members, the greater part of each cross member being within the pitch line of travel of said endless carrier, for the purpose referred to.

EARL G. GRIFFITH.